June 3, 1924.
J. C. VANDIVEER
BOLL WEEVIL MACHINE
Filed April 21, 1923 3 Sheets-Sheet 1
1,496,395
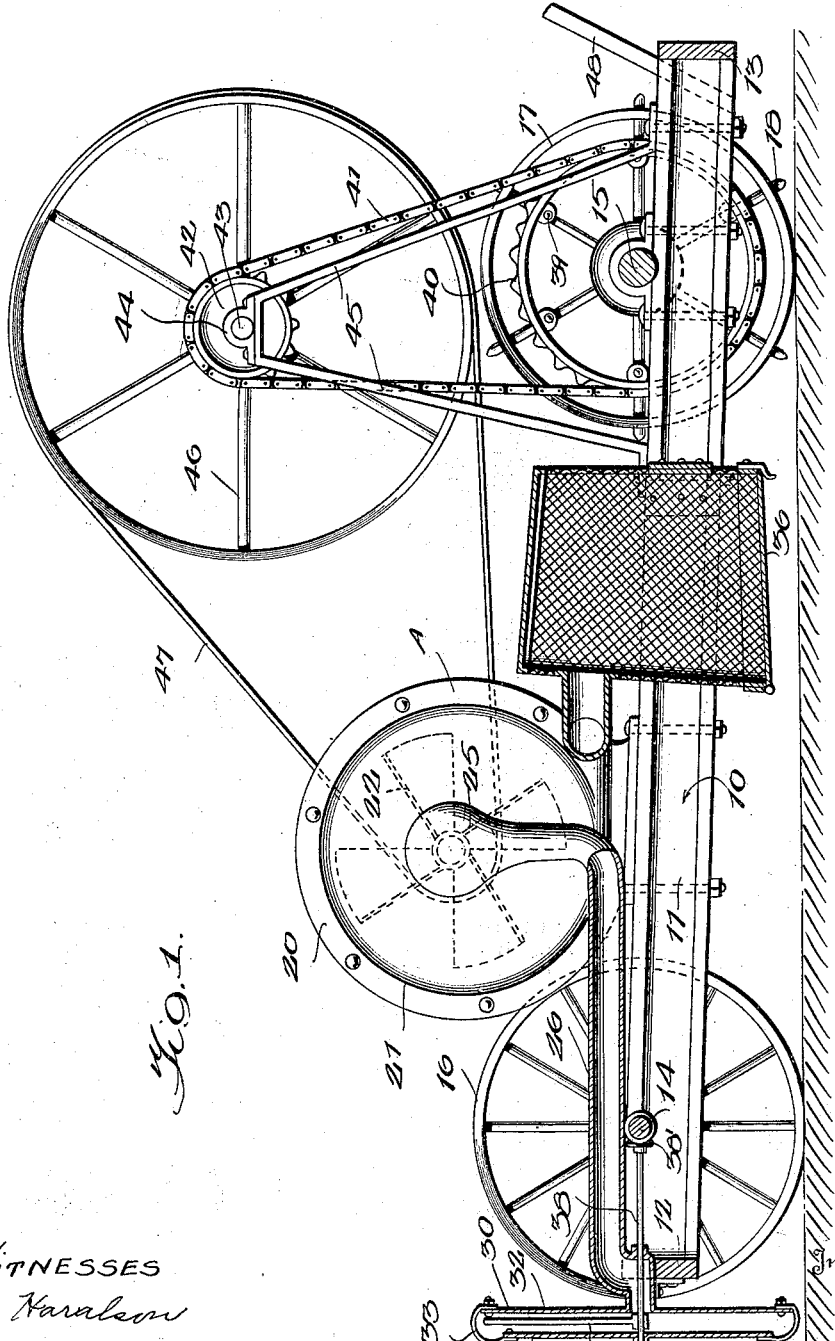

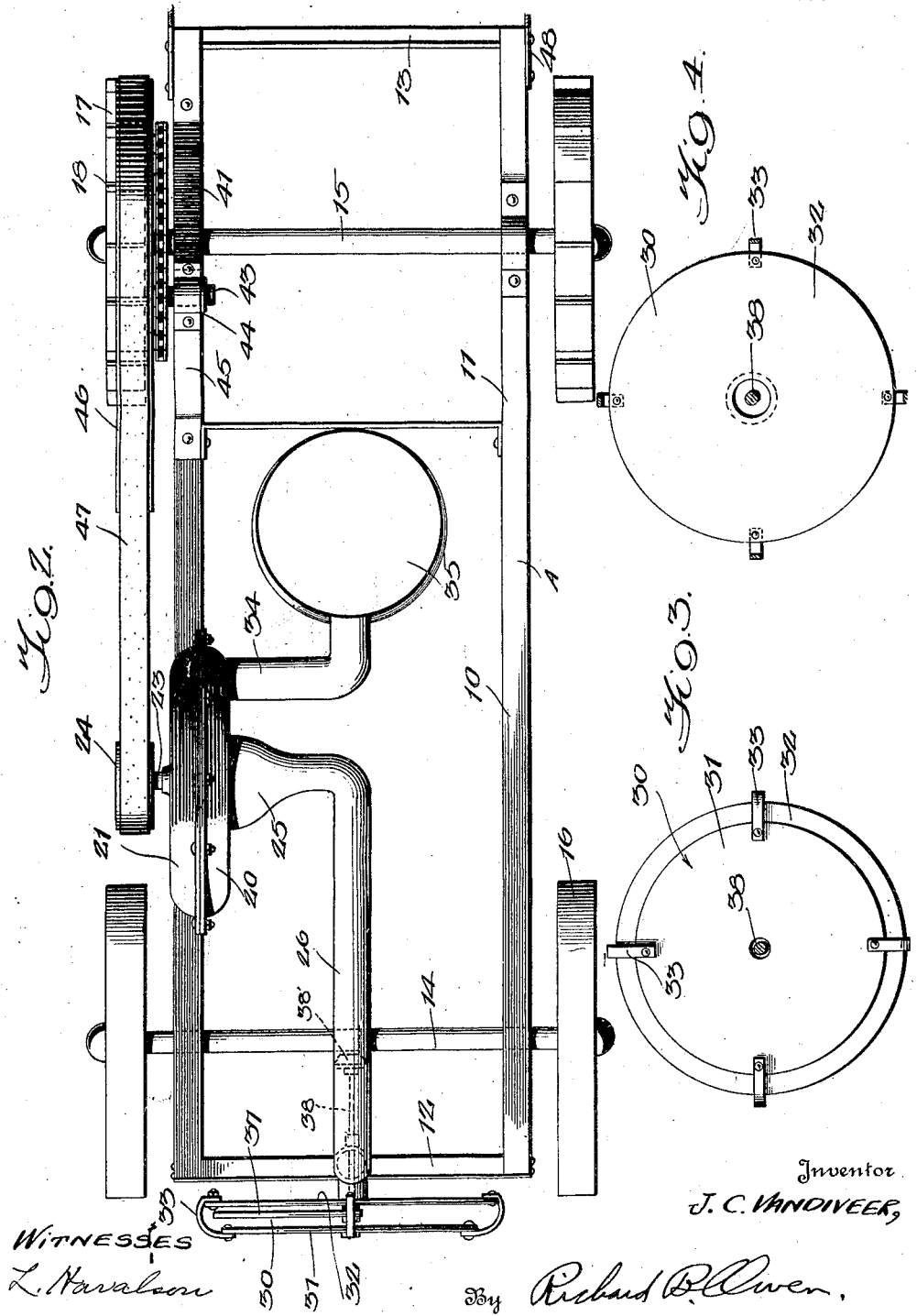

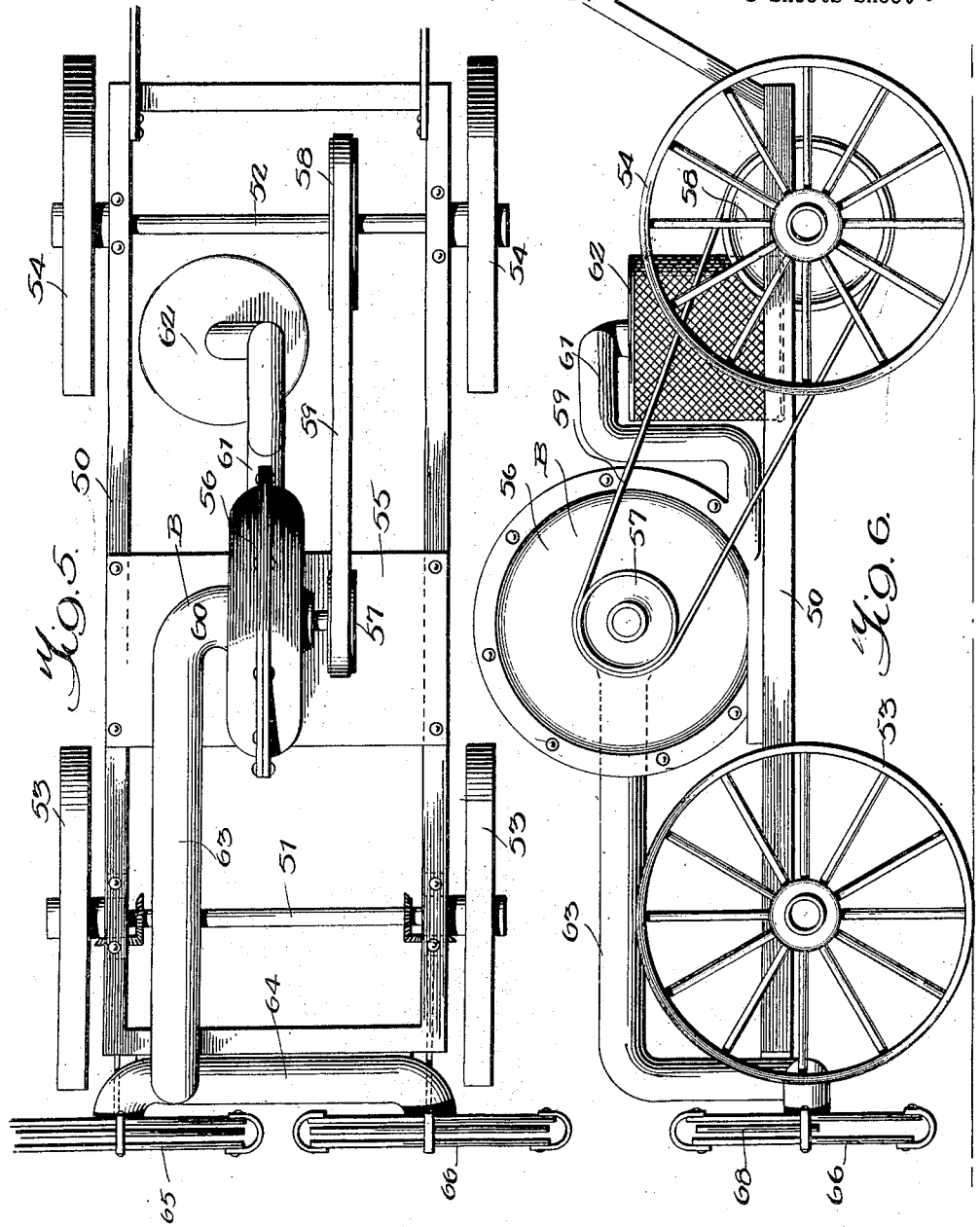

Patented June 3, 1924.

1,496,395

UNITED STATES PATENT OFFICE.

JOHN CALVIN VANDIVEER, OF HENNING, TENNESSEE.

BOLL-WEEVIL MACHINE.

Application filed April 21, 1923. Serial No. 633,724.

*To all whom it may concern:*

Be it known that I, JOHN C. VANDIVEER, a citizen of the United States, residing at Henning, in the county of Lauderdale and State of Tennessee, have invented certain new and useful Improvements in a Boll-Weevil Machine, of which the following is a specification.

This invention relates to means for taking insects from and around growing plants and more particularly to improvements in a machine for gathering and destroying boll weevils from cotton plants.

The primary object of the present invention is to provide a cotton boll weevil destroying machine having novel nozzle members for effectively removing and catching all of the boll weevils from and around the cotton plants and means for creating a suction through said nozzles.

Another prime object of the invention is to provide a vehicle either of the horse drawn or tractor type constructed in different sizes for operating one or more rows of cotton plants simultaneously embodying a frame having the novel nozzles connected with the forward end thereof, a suction fan and casing connected with the nozzles and a reticulated receptacle connected with the said suction fan for receiving the insects therefrom, the suction fan being adapted to be driven from one of the ground engaging wheels in case the vehicle is of the horse drawn type or connected with the motor of the vehicle, if the vehicle is of the power type.

Another prime object of the invention is to provide a novel suction head having means rotatably mounted therein and driven from the vehicle for preventing the clogging up of the nozzle and thereby insuring the correct operation of the vehicle under all circumstances.

A still further object of the invention is to provide an improved boll weevil destroying machine of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a longitudinal section through one form of the improved device.

Figure 2 is a top plan view of this form of the device.

Figure 3 is a front elevation of the improved suction head carried by the device.

Figure 4 is a section through the suction head.

Figure 5 is a top plan view of a modified form of the machine which is adapted to be used as a two-row machine, and Figure 6 is a side elevation of the same.

Referring to the drawings in detail, wherein similar reference characters designate corresponding parts throughout the several views the letter A generally indicates one form of the machine shown in Figures 1 to 4 inclusive and the letter B designates another form of the machine shown in Figures 5 and 6 inclusive.

The machine A is adapted to be used as a single row machine, while the machine B is adapted to be used as a double row machine and it is to be understood at this point that the same may be made in larger sizes if so desired.

The machines A and B also are shown to be of the horse drawn type, but it is obvious that the principle of the invention can be incorporated with a motor truck or other motor vehicle. The improved machine A embodies a frame 10 including the longitudinally extending side channel beams 11 and the end transverse beams 12 and 13. The side channel beams 11 support front and rear axles 14 and 15, which can be mounted in suitable bearings carried by the said beams. As shown the front axle 14 has secured thereto in any preferred way front ground engaging wheels 16, while the rear axle 15 has connected thereto in any preferred way rear ground engaging wheels 17, which can be provided with ground engaging cleats 18, if so desired.

Mounted upon the frame 10 in any preferred manner is a suitable enlarged suction member 20, which embodies a two-part housing 21 and a rotatable fan 22. The fan 22 is keyed or otherwise secured to a suitable shaft 23 which extends outwardly on one side of the housing 21 and has keyed or otherwise secured thereto a drive pulley 24, the purpose of which, will be hereinafter more fully described. The housing 21 has communicating therewith an intake head 25 and the intake head 25 has connected therewith the longitudinally extending intake pipe 26, the extreme forward end of which communicates with the axial center of the insect collecting head or nozzle 30. This insect collecting head or nozzle 30 embodies front and rear disk-shaped plates 31 and 32, and it is to be noted that the front plate 31 is of a less diameter than the rear plate 32 and is connected therewith by brackets 33 which hold the plates in spaced relation. The space around the plates constitutes the intake nozzle for permitting the sucking of the boll weevils from off of the cotton plants. As the boll weevils are sucked into the nozzle, the same are brought back through the pipe 26 into the housing 21 and then into the discharge pipe 34 which leads to the deposit receptacle 35. This deposit receptacle 35 preferably has its side walls thereof made of reticulated material to permit the contents thereof to be readily seen and this receptacle can be connected in any preferred way to the frame 10 of the machine. If desired this receptacle can be made removable so as to permit the contents to be readily destroyed, or as shown in the drawings the receptacle can be provided with a lower hinge wall 36 so as to permit the boll weevils to be dumped therefrom.

In order to prevent the clogging up of the intake nozzle or head 30, a rotatable blade 37 is mounted within the nozzle and arranged for movement between the plates 31 and 32. As shown the blade 37 is keyed or otherwise secured to a drive shaft 38, having connection with the front axle 14 through suitable meshing beveled gears 38'.

The fan can be driven in any desired manner, and as shown the fan is driven from one of the rear wheels 17. One of the rear wheels 17 has bolted or otherwise secured thereto as at 39 a ring gear 40 around which is trained a drive sprocket chain 41. The drive sprocket chain 41 is also trained about a relatively small drive sprocket wheel 42 keyed or otherwise secured to a stub shaft 43. This stub shaft 43 is mounted in suitable bearings 44 carried by the upstanding frame 45 secured to one of the channel beams 11. This shaft 43 has keyed or otherwise secured thereto a relatively large balance wheel 46 and trained about this balance wheel is a drive belt 47. This drive belt 47 is also trained about the drive pulley 24 and thus it can be seen that as the machine is pulled over the ground, that the fan will be effectively driven at a relatively high rate of speed from one of the ground engaging wheels. The front portion of the frame 10 can have secured thereto any preferred type of draft appliance, while the rear end of the frame can be provided with guiding handles 48.

The form B of the invention is adapted to be pulled across a field by a team of horses and is adapted to operate simultaneously on two rows of plants, otherwise the construction thereof is similar to the form A shown in Figures 1 to 4 inclusive.

The form B comprises a frame 50 having connected thereto by suitable bearings the front and rear axles 51 and 52, which have secured thereto the front and rear ground wheels 53 and 54. A bed plate 55 is secured to the frame 50 and has arranged thereon in any preferred manner a suction fan 56 having a drive pulley 57 which is in alignment with a drive pulley 58 keyed or otherwise secured to the rear axle 52. These pulleys 57 and 58 have trained about the same a drive belt 59 and thus it is obvious that as the frame 50 is drawn over the field that the suction fan 56 will be operated. It is to be of course understood that the suction fan can be driven by a suitable motor which can be mounted upon the frame if so desired.

The suction fan 56 has communicating therewith the intake nozzle head 60 and the outlet pipe 61 which leads to a suitable deposit box 62 for the insects. The intake suction head 60 has communicating therewith a forwardly extending horizontally disposed pipe 63 which in turn communicates with a transversely extending front suction pipe 64 which has communication with the axial centers of a pair of intake suction nozzles 65 and 66. These intake suction nozzles 65 and 66 are of substantially the same construction as the intake nozzle 30 shown in the form A of my invention, and these nozzles also have rotatably mounted therein the insect or beater blade 68 which can be driven in any preferred manner from the front axle 51.

Of course the machines can be considered as tractors if so desired instead of horse drawn vehicles.

Changes in details may be made without departing from the spirit or the scope of this invention.

What I claim as new is:—

1. A boll weevil destroying machine comprising a wheeled frame, a suction fan mounted upon the frame including inlet and outlet pipes, means for driving the fan, an insect deposit receptacle communicating with the outlet pipe, and insect gathering nozzle communicating with the inlet pipe and including a pair of front and rear spaced plates, the front plate being of a less diameter than the rear plate, and bowed brackets connecting the plates together in spaced relation.

2. An insect destroying machine comprising a wheeled frame, a suction fan mounted upon the frame including an inlet and outlet pipe, means for driving the fan, an insect intake nozzle including a pair of spaced circular plates, the inlet pipe communicating with the axial center of the nozzle and extending through one of said plates, a rotatable beater blade mounted in said nozzle between said plates, and an insect receiving receptacle communicating with the outlet pipe.

In testimony whereof I affix my signature in presence of two witnesses.

JOHN CALVIN VANDIVEER.

Witnesses:
M. D. DIAL,
J. B. FRANKLIN.